US005506710A

United States Patent [19]
Hamel

[11] Patent Number: 5,506,710
[45] Date of Patent: Apr. 9, 1996

[54] ADD - DROP MULTIPLEXER

[75] Inventor: Andre Hamel, Lannion, France

[73] Assignee: France Telecom Establissement autonome de droit public, Paris, France

[21] Appl. No.: 50,640

[22] Filed: Apr. 22, 1993

[30] Foreign Application Priority Data

Apr. 29, 1992 [FR] France .................................. 92 05295

[51] Int. Cl.$^6$ .................................................. H04B 10/20
[52] U.S. Cl. ......................... 359/115; 359/120; 359/121
[58] Field of Search ...................................... 359/118, 120, 359/121, 124, 125, 173, 115; 385/24

[56] References Cited

U.S. PATENT DOCUMENTS

| | | | |
|---|---|---|---|
| 4,873,681 | 10/1989 | Arthurs et al. | 359/121 |
| 5,005,167 | 4/1991 | Arthurs et al. | 370/4 |
| 5,105,292 | 4/1992 | Le Roy et al. | 359/123 |
| 5,353,145 | 10/1994 | Le Coquil et al. | 359/120 |

FOREIGN PATENT DOCUMENTS

| | | |
|---|---|---|
| 0347903 | 12/1989 | European Pat. Off. . |
| 0434236 | 6/1991 | European Pat. Off. . |
| 0460398 | 12/1991 | European Pat. Off. . |

OTHER PUBLICATIONS

Journal of Lightwave Technology, vol. 7, No. 11, Nov. 1, 1989, pp. 1798–1805, N. Fujimoto, et al., "Photonic Highway: Broad-Band Ring Subscriber Loops Using Optical Signal Processing".
IEEE Transactions On Communication Technology, vol. 37, No. 6, Jun. 1, 1989, pp. 645–648, E. Arthurs, et al., "A Broadband Optoelectronic Packet Switching System".
Proceedings IEEE International Conference On Communications, vol. 2, Jun. 11, 1989, pp. 734–738, G. R. Hill et al., "Wavelength Routing For Long Haul Networks".
A Novel Distributed Photonic Switch, Fiorretti et al, "Proceedings of the international switching symposium 28 MEI", Jun. 1, 1990 p. 11.
IBM Technical Disclosure Bulletin vol. 31 No. 11 Apr. 1989.
IBM Technical Disclosure Bulletin vol. 32 No. 10B May 1990.
IBM Technical Disclosure Bulletin vol. 37 No. 4B Sep. 1989.

Primary Examiner—Leo Boudreau
Assistant Examiner—Rafael Bacares
Attorney, Agent, or Firm—Oblon, Spivak, McClelland, Maier & Neustadt

[57] ABSTRACT

An add-drop multiplexer includes a first photodector (14), which receives informations in optical form, some of which are to be supplied to users addressees or recipients chosen from among N users addressees or recipients associated with the wavelengths L1, . . . , LN, whilst the other informations form an output flow at wavelength LO, a second photodetector (16) receiving in optical form informations to be inserted in said flow, a tunable source (18), which converts the signals from the first photodetector into optical signals of wavelengths chosen from among LO, L1 . . . LN under the control of control unit (20) and as a function of their destination, another source (22), which converts the signals from the second photodetector into optical signals of wavelength LO, a coupler (24) connecting the sources to N+1 filters (f0 . . . , f3) only respectively permitting the passage of LO . . . LN. Application to optical telecommunications.

5 Claims, 3 Drawing Sheets

ADD - DROP MULTIPLEXER

BACKGROUND OF THE INVENTION

1. Field of the Invention

The present invention relates to an add-drop multiplexer. It more particularly relates to the field of optical telecommunications.

The aim of the invention is to extract from an optical line informations transmitted in optical form by said line and for inserting other informations in optical form into said line.

2. Description of the Related Art

Known add-drop multiplexers use an electronic technology and therefore suffer from disadvantages. They are not suitable for the processing of informations at high speed and do not allow rapid switching operations.

SUMMARY OF THE INVENTION

The object of the invention is to obviate these disadvantages and proposes an add-drop multiplexer using an optical technology, which permits the use of optical signals of different wavelengths and leads to a high switching speed.

More specifically, the present invention relates to an add-drop multiplexer, characterized in that it comprises:

- a first photodetector for receiving an input information flow in optical form and for converting the same into electrical signals, certain of the informations having to be extracted from the input flow and supplied respectively to addressees chosen from among N addressees, whilst other informations are intended to form an output information flow, N being an integer at least equal to 1, the N addressees being respectively associated with N optical wavelengths L1, ... LN, which are different from one another, whilst the output information flow is at wavelength LO,

- a second photodetector for receiving informations in optical form and which are to be inserted in the output information flow and for converting into the form of electrical signals said informations to be inserted,

- a first tunable, electrooptical converter, which receives the electrical signals from the first detector and which is able to convert them into optical signals of wavelengths chosen from among LO, L1 ..., LN,

- control means for controlling the first electrooptical converter so that the latter supplies said signals with wavelengths chosen from among LO, L1, ..., LN, as a function of the destination of the corresponding informations which have reached the first photodetector,

- a second electrooptical converter for receiving the signals supplied by the second photodetector and for converting them into optical signals of wavelength LO,

- an optical coupler having two inputs and N+1 outputs, said inputs being respectively connected to the outputs of the converters and

- N+1 optical filters, whose inputs are respectively connected to the outputs of the coupler and which respectively permit the passage of the wavelengths LO, L1, ..., LN and only the said wavelengths.

Thus, the output information flow is available at the filter output, which only permits the passage of LO and the informations intended for the addressees are respectively available at the outputs of the filters only permitting the passage of L1, ..., LN.

The add-drop multiplexer according to the invention can, when it is inserted in a fibre optic communication network, be able to adapt to the evolution of traffic and modify the configuration of the network under instructions from the control means.

With the development of fibre optic transmissions, it is of interest to be able to increase the coherence of such a network from the optical standpoint.

According to a special embodiment of the multiplexer according to the invention, its control means are also provided for controlling the second electrooptical converter, so that the latter emits pulse stuffing signals of wavelength LO, said signals occupying the place of extracted informations.

The multiplexer according to the invention can also comprise optical amplification means for receiving the information flow from the optical filter only permit ting the passage of LO and for amplifying the optical intensity of this flow.

The optical filters of the multiplexer can be fixed filters or tunable filters, which are respectively positioned on the wavelength LO, L1, ..., LN.

Finally, the second electrooptical converter of the multiplexer according to the invention can be a tunable electrooptical converter, which is positioned on the wavelength LO.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
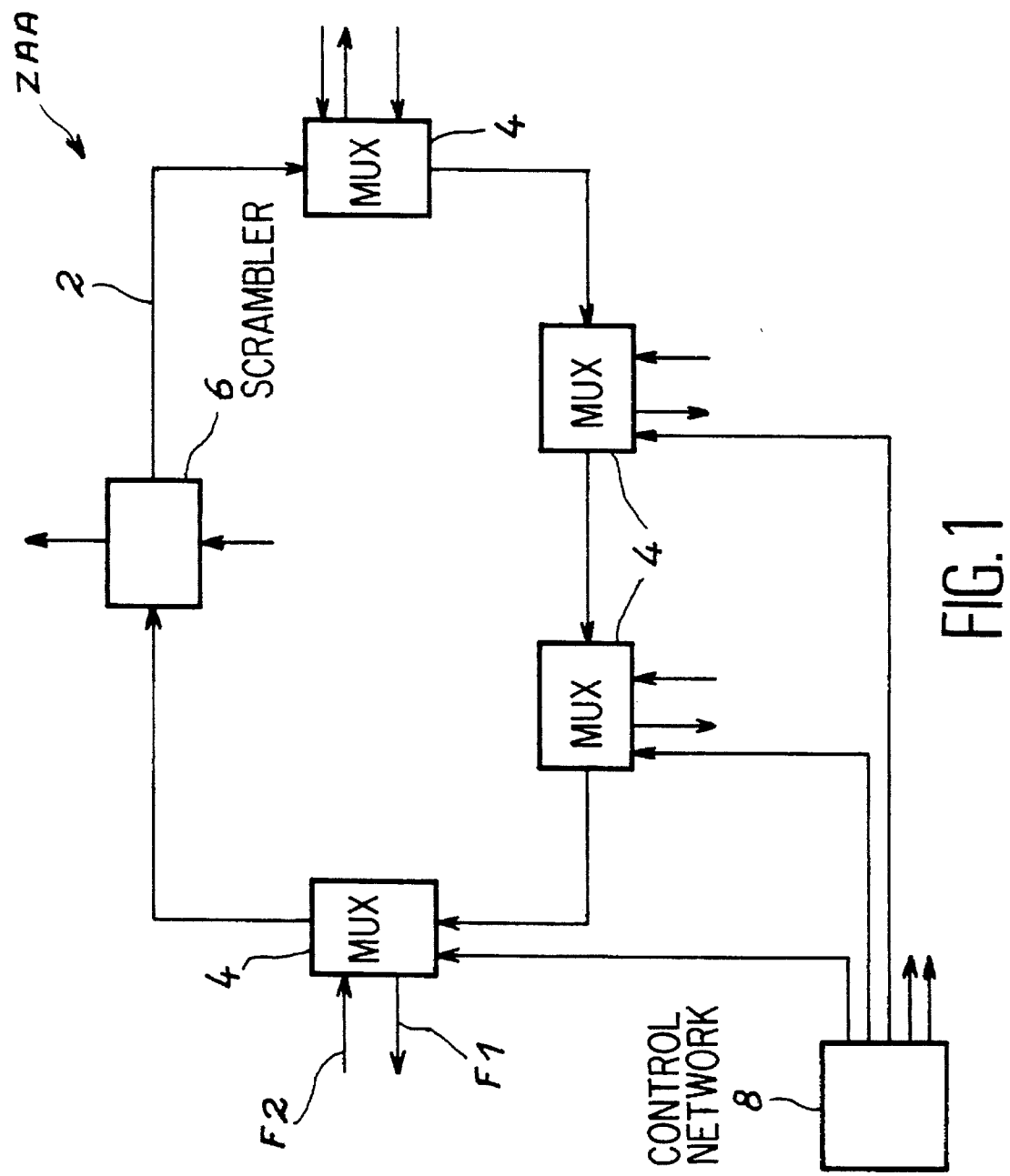
FIG. 1 A diagrammatic view of a telecommunications network using add-drop multiplexers according to the invention.

FIG. 1 diagrammatically illustrates an embodiment of the invention. It is possible to see a telecommunications network forming a Routing Autonomy Zone RAZ having five centres, which are joined by a fibre optic transmission loop 2.

The informatian rate transmitted by said loop is 155 Mbit/s or optionally 620 Mbit/s.

Among the centres of the RAZ, there are four add-drop multiplexers 4 according to the invention, as well as a digital distribution frame scrambler 6, which connects the RAZ to a not shown interconnection network. Moreover, the multiplexers 4 and the digital distribution frame scrambler 6 are controlled by a telecommunications control network 8, which is a monitoring network for monitoring the quality of the transmissions.

Each add-drop multiplexer 4 receives an input information flow from the multiplexer preceding it on the transmission loop 2 and supplies an output information flow to the multiplexer following it on said transmission loop. Moreover, each multiplexer 4 serves to extract from the input information flow reaching it, the informations which are intended for users associated with said multiplexer 4.

This is symbolized by an arrow F1 in FIG. 1, the information rate supplied to the users being e.g. 2 Mbit/s. This multiplexer 4 also permits the insertion into the information flow which it supplies of other information, whose rate is e.g. 2 Mbit/s. This is symbolized by the arrow F2 in FIG. 1.

Figure 2:
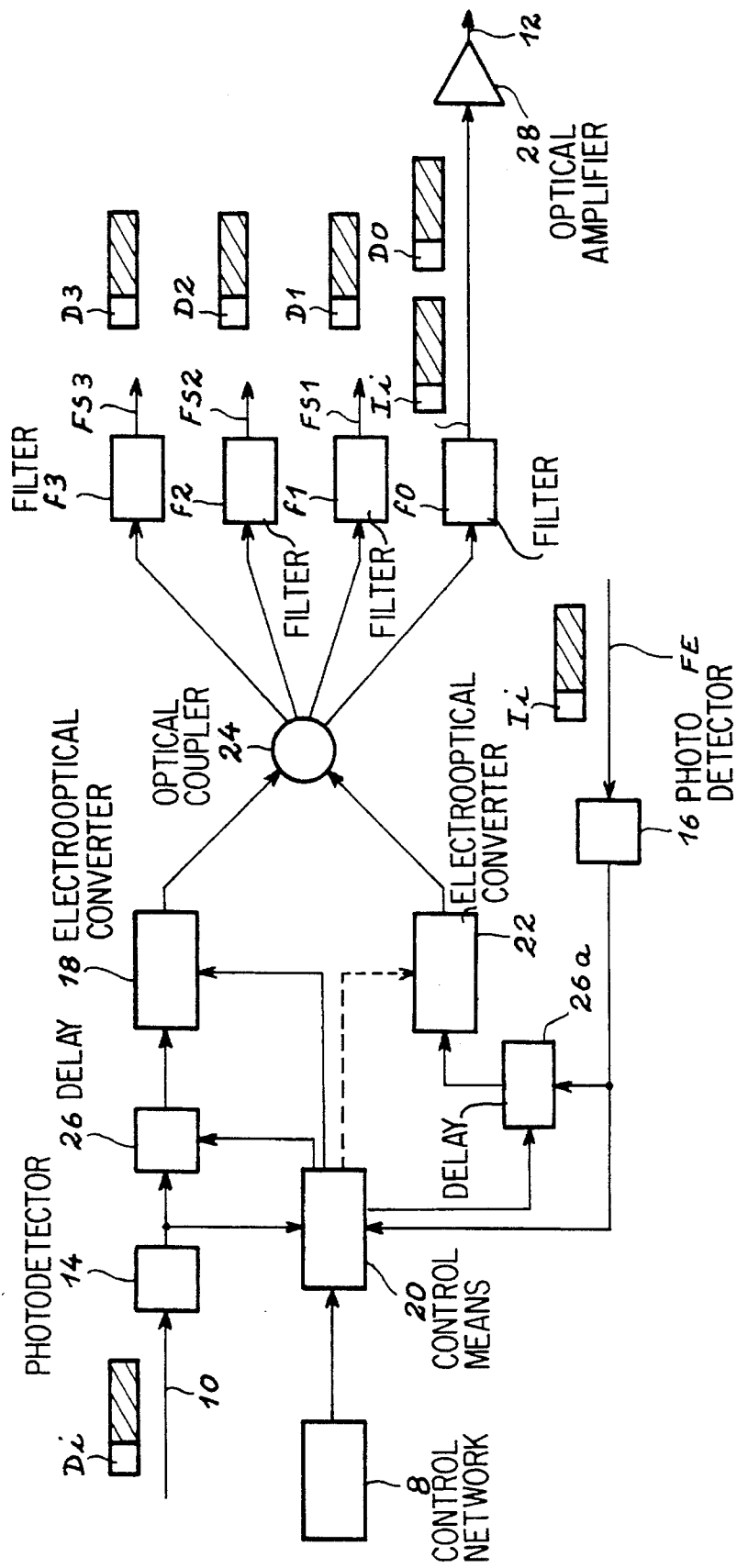
FIG. 2 A diagrammatic view of a special embodiment of the add-drop multiplexer according to the invention.

FIG. 2 diagrammatically shows an add-drop multiplexer according to the invention.

Following the description of the structure of this multiplexer, details will firstly be given on its operating mode with informations transmitted in the asynchronous transfer mode, which offers great flexibility for the simultaneous exploitation of services at different rates ranging between a few kbit /s to several dozen Mbit/s.

Information transfer takes place in the form of cells having a constant length (53 bytes) and independently of the nature of the transferred information. Apart from the transmitted information, each cell contains a tag (5 bytes) reserved for the control (Virtual Pass Identifier—VPI, Virtual Channel Identifier—VCI, etc.).

It will be shown hereinafter that the proposed solution is also applicable to the synchronous hierarchy with a rate of 155 Mbit/s, because the headers make it possible to identify the position of the informations at the rate of 2 Mbit/s.

The add-drop multiplexer according to the invention and which is diagrammatically shown in FIG. 2 receives by an optical fibre 10 an input information flow in optical form and supplies in optical form an output information flow, which is transmitted by an optical fibre 12.

The multiplexer shown in FIG. 2 is associated with N users or addressees, N being equal to 3 in FIG. 2 and makes it possible to extract from the input flow the informations respectively intended for these users and which are supplied to them in optical form by means of the optical fibres FS1, FS2 and FS3.

In addition, the multiplexer of FIG. 2 serves to insert into the output information flow other informations reaching it in optical form by means of an optical fibre FE.

The multiplexer shown in FIG. 2 comprises a first photodetector 14, a second photodetector 16, a first electrooptical converter 18, control means 20, a second electrooptical converter 22, an optical coupler 24 having two inputs and N+1 outputs (4 outputs in the embodiment shown in FIG. 2) and N+1 optical filters, namely 4 optical filters to, f0, f1, f2 and f3 in the case of FIG. 2, the output information flow being available at the output of the optical filter f0, whilst the informations respectively intended for the three users are respectively available at the output of the filters f1, f2 and f3.

In the multiplexer shown in FIG. 2, a wavelength LO is associated with the output information flow and wavelengths L1, L2 and L3, which differ from one another, are respectively associated with the three users, in such a way that the informations transmitted by the fibres FS1, FS2 and FS3 are respectively at wavelength L1, wavelength L2 and wavelength L3.

The photodetector 14 receives the input information flow by means of the fibre 10 and converts said informations into electrical signals. The photodetector 16 receives by means of the fibre FE, the informations which it is wished to insert in the output flow and transforms these informations into electrical form.

The tunable electrooptical converter 18 receives the signals from the photodetector 14 and, under the control of the control means 20, converts these signals into optical form at the desired wavelength as a function of whether the corresponding informations are intended to pass into the output information flow or are intended for one of the users.

The electrooptical converter 22 receives the electrical signals supplied by the photodetector 16 and converts them into optical signals of wavelength LO. The two inputs of the optical coupler 24 are respectively connected to the outputs of the converters 18 and 22 and the four outputs of said coupler 24 are respectively connected to the inputs of the filters f0, f1, f2 and f3. The filters f0, f1, f2 and f3 respectively permit the passage of the wavelengths LO, L1, L2 and L3 and only these wavelengths.

The informations transmitted in the asynchronous transfer mode are in the form of cells with a header having control informations and in particular the destination address Di. The rate of these cells is e.g. 10 Mbit/s.

These informations reach the multiplexer, which detects them by direct detection by means of the photodetector 14.

A fixed time lag T is applied to the signals from the photodetector 14 to take account of the calculation time of the control means 20. The time lag T is applied by lag means 26, which are fitted between the photodetector 14 and the converter 18, as can be seen in FIG. 2.

FIG. 2 also shows the control means 20, which are connected to the control network 8 for monitoring the traffic. By means of the photodetector 14, the control means 20 become aware of the destination address contained in the header of an incident cell. If this address is DO, the information is not intended for any of the users of the distribution zone associated with the multiplexer of FIG. 2 and the tunable converter 18 is maintained at the wavelength LO.

The cell whose address is DO is then transmitted by the output fibre 12 after traversing the filter f0. If the address of the cell is D3, said cell is intended for this distribution zone and more specifically the user associated with the wavelength L3. The tunable converter 18 is then switched to said wavelength L3.

This address cell D3 is optically transposed to the wavelength L3 and is supplied to the optical coupler 24.

Only the optical filter f3 positioned on the wavelength L3 allows the passage of this cell, which is switched to the output FS3 corresponding to the user for which said cell is intended.

The same process occurs when an address cell D1 or D2 is processed by the control means. Such a cell (address cell D1 or D2) is located at the output corresponding to its addressee (and at the wavelength L1 or L2).

From what has been stated hereinbefore it is clear that the information flow at the output of the multiplexer has gaps corresponding to the time location of the cells which have been extracted and switched to the users for which they are intended.

These gaps can be left in the output flow, but it is also possible to insert new cells during these times by means of the electrooptical converter 22, either for transmitting informations in the network by inserting them into the output information flow, or for carrying out a stuffing of the transmission line in order to maintain the presence of a timing frequency.

The electrooptical converter 22 produces stuffing cells under the control of the control means 20. The latter are also informed by the photodetector 16 of the arrival of informations to be inserted in the output flow.

As can be seen in FIG. 2, means 26a controlled by the means 20 are provided for delaying the informations to be inserted, in order to place them in he time locations freed by the extraction.

The electrooptical converter 22 can be a tunable electrooptical converter and in this case it is positioned at the wavelength LO by means (not shown) or by the control means 20.

In the same way, the optical fitters f0, f1, f2 and f3 can be tunable filters, but respectively positioned an the wavelengths LO, L1, L2 and L3 by not shown means or by control means 20.

Figure 3:
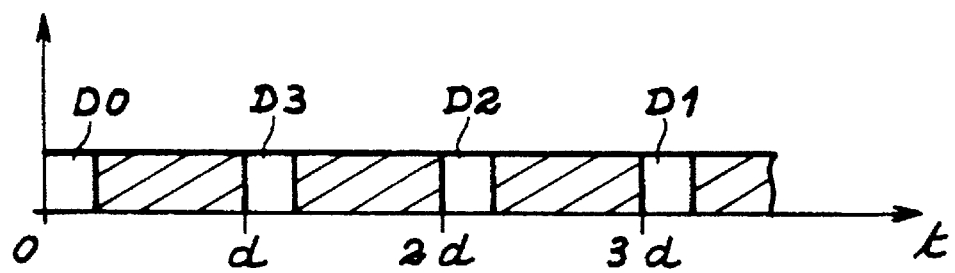
FIG. 3 A timing diagram showing the signals reaching the input of the multiplexer of FIG. 2.

The timing diagram of FIG. 3 shows the cells arriving at the input of the add-drop multiplexer of FIG. 2. In FIG. 3, t represents the time and d the duration of a cell.

Figure 4:
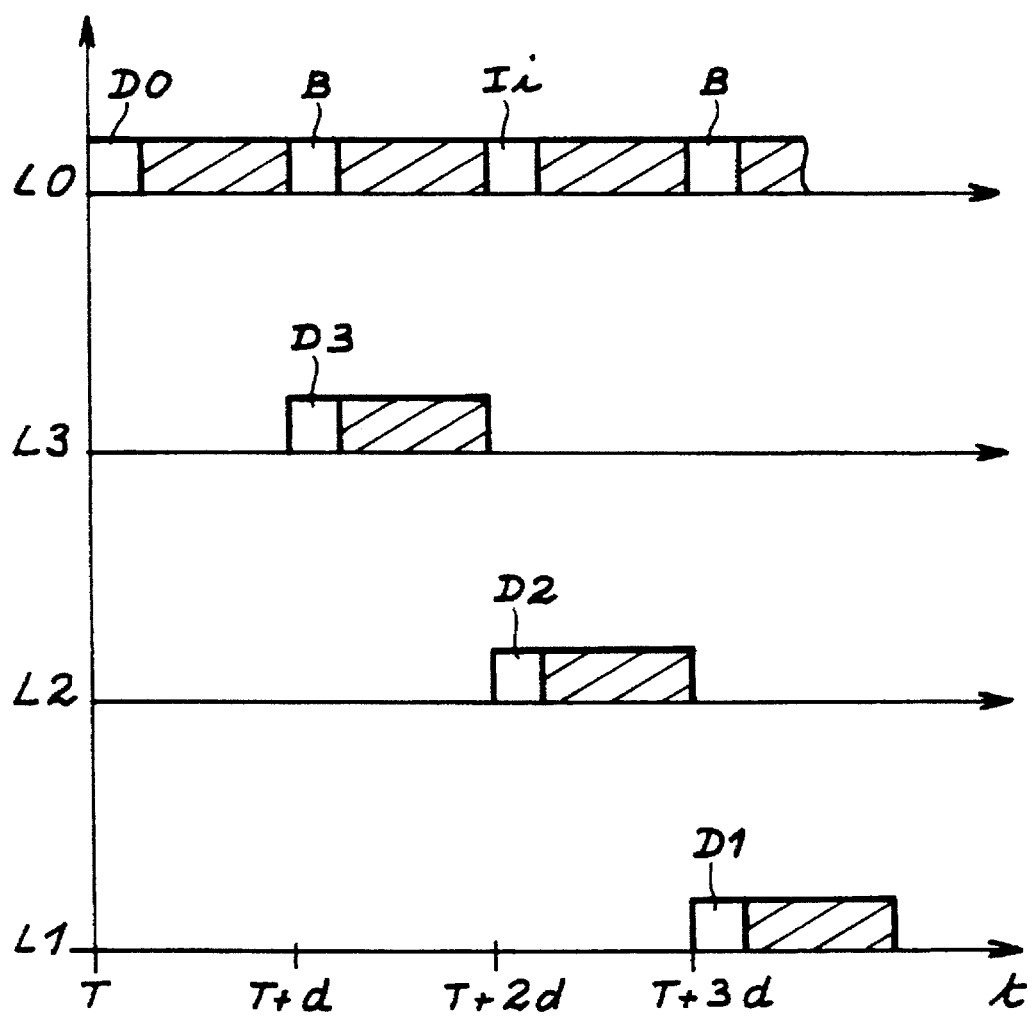
FIG. 4 A timing diagram showing the signals present at the output of the multiplexer of FIG. 2.

The timing diagram of FIG. 4 shows the informations which are supplied to the different users, as well as the informations present in the output flow. FIG. 4 also illustrates the possibility of inserting into the output flow stuffing cells B, as well as informations constituted by cells, whose address is designated Ii.

The tunable electrooptical converters or sources have good frequency modulation performance characteristics. Modulation frequencies of 1 GHz have been obtained and the emission line width is between a few MHz and 30 MHz, as a function of the experimental conditions.

It should be noted that the filters used in the multiplexer perform wavelength selection and the conversion of frequency-modulated signals into amplitude-modulated signals.

At the output of the filter f0 can be provided an optical amplifier 28 for compensating the optical losses due to the coupler 24 and to filter f0. Switching times of approximately 1 ns are possible with tunable sources.

If imposed by the organizational needs of the network, the control means 20 can be used for modifying the header content of the cells, when the latter are in the form of electrical signals and therefore prior to their transposition into optical form, so as to indicate a new destination address to the cells, which are directly switched to the output optical fibre 12.

The add-drop multiplexer of FIG. 2 is dimensioned so as to respond to the maximum number of outputs required, but this number can be reduced by software control based on the control network 8.

As has already been stated, the control means 20 can be designed so as to ensure a complete flow of the asynchronous transfer mode or ATM cells, which improves the performance characteristics of the transmission system, because the transmission timing is maintained and the clock recovery is then guaranteed. In this case, the stuffing cells are fed into the network.

However, these stuffing cells are not emitted when cells containing informations, which have priority, reach the multiplexer for insertion in the output information flow.

The present invention is not limited to the processing of informations transmitted in the asynchronous transfer mode. The invention is also usable in an optical loop carrying digital signals in accordance with the synchronous hierarchy, i.e. informations transmitted in the synchronous transfer mode, e.g. at a rate of 155 Mbit/s (for order 1 synchronous transfer modules).

Each module is constituted by signals grouped in the form of containers. One container type is defined for a given rate, e.g. 2 Mbit/s. Containers of different sizes can be included in a main container (order 1 synchronous transfer module). It is therefore possible to group 63 2 Mbit/s containers in a single order 1 synchronous transfer module. The control informations added to the data give the address and the position of each of the lower order containers. It is therefore possible to use an add-drop multiplexer according to FIG. 2 for processing informations transmitted in the synchronous transfer mode.

For producing electrooptical converters 18 and 22, use is e.g. made of multielectrode, semiconductor laser diodes (2 or 3 electrodes). Such components are referred to in the article by M.J. CHAWKI et al, published in Journal of Optical Communications, vol. 11, no. 3, Mar. 1990, pp.98–100.

Good results are obtained with a feedback laser distributed over a length of 200 micrometres. The continuous tunability range of 1.55 micrometre is equal to 200 GHz (i.e. 1.5 nm). The laser line width is a maximum of 25 MHz. A discontinuous tuning is obtained on a 10 nm range.

Another distributed reflector laser permitting a continuous tuning on 4.4 nm is described the article by O. ISHIDA, published in Journal of Lightwave Technology, vol. 9, no. 9, Sep. 1991, pp.108–1093.

The optical filters f0, f1, f2 and f3 are preferably narrow optical filters and are e.g. formed with the aid of Fabry-Perot interferometers.

Use is e.g. made of filters marketed in the form of fibre components by MICRON-OPTICS, said filters having a full width at half maximum between 1 GHz (0.O1 nm) and 100 GHz (0.8 nm). These filters are electrically tunable with a switching time of approximately 10 ms.

For illustration and in non-limitative manner, the wavelength L0, L1, L2 and L3 are respectively 1519.4, 1521.1, 1521.3 and 1521.5 nm and use is made of fillers marketed by MICRON-OPTICS, whose full width at half maximum is 10 GHz (0.08 nm).

I claim:

1. An add-drop multiplexer, comprising:

a first photodetector for receiving informations in an input information flow in optical form and for converting the same into electrical signals, certain of the informations having to be extracted from the input flow and supplied respectively to addressees chosen from among N addresses, whilst the other informations are intended to form an output information flow, N being an integer at least equal to 1, the N addressees being respectively associated with N optical wavelengths L1, . . . , LN, which are different from one another, whilst the output information flow is at wavelength LO;

a second photodetector for receiving informations in optical form and which are to be inserted in the output information flow and for converting into the form of electrical signals said informations to be inserted;

a first electrooptical converter, which is tunable and receives the electrical signals from the first detector and which is able to convert them into optical signals of wavelengths chosen from among LO, L1, . . . , LN;

control means for controlling the first electrooptical converter so that the latter supplies said signals with wavelengths chosen from among LO, L1, . . . , LN, as a function of the destination of the corresponding informations which have reached the first photodetector;

a second electrooptical converter for receiving the electrical signals converted by the second photodetector and for converting them into optical signals of wavelength LO, wherein the control means also controls the second electrooptical converter to emit stuffing signals having a wavelength LO, said stuffing signals occupying the place of extracted informations;

an optical coupler having two inputs and N+1 outputs, said inputs being respectively connected to the outputs of the converters; and N+1 optical filters having inputs respectively connected to the outputs of the coupler and which respectively permit the passage of the wavelengths LO, L1, ..., LN and only the said wavelengths.

2. An add-drop multiplexer, comprising:

a first photodetector for serially receiving optical signals, corresponding to information cells with header information Di indicating one of 1-N addressees, for converting the received cells into electrical signals;

a first electrooptical converter for converting the electrical signals converted by the first photodetector corresponding to one of the information cells into an optical signal having a predetermined wavelength L1-LN;

a second photodetector for serially receiving optical signals, corresponding to output information cells with header information Ii indicating an output information cell, and converting the output information cells into electrical signals;

a second electrooptical converter for converting the electrical signals converted by the second photodetector into optical signals of wavelength LO;

an optical coupler for coupling the optical signals from the first electrooptical converter and the second electrooptical converter;

a plurality of optical filters receiving coupled optical signals from the optical coupler, each filter having a different filter frequency corresponding to different wavelengths of the predetermined wavelength LO-LN;

wherein, the information cells are output through optical lines to different addressees 1-N;

wherein, the output information cells are output to a fiber optic network; and control means for controlling the first electrooptical converter to set the predetermined wavelength of the optical signals converted by the first electrooptical converter to a value of L1-LN according to the information header Di of the information cell and for controlling the second electrooptical converter to output a stuffing cell with predetermined wavelength L1-LN during times when an optical filter of the optical filters corresponding to a particular predetermined wavelength is not outputting an information cell.

3. Multiplexer according to claim 1, further comprising: optical amplification means for receiving the information flow from the optical filter (f0) only permitting the passage of LO and for amplifying the optical intensity of said flow.

4. Multiplexer according to claim 1, wherein the optical filters (f0, f1, f2, f3) are tunable filters respectively positioned on the wavelength LO, L1, ..., LN.

5. Multiplexer according to claim 1, wherein the second electrooptical converter is a tunable electrooptical converter positioned on the wavelength LO.

* * * * *